US012779995B2

(12) United States Patent
Seder et al.

(10) Patent No.: US 12,779,995 B2
(45) Date of Patent: Nov. 3, 2026

(54) AUGMENTED REALITY VEHICLE SYSTEMS WITH HEAD-UP DISPLAY MODULES HAVING VARIABLE IMAGE PLANE CAPABILITIES TO PROVIDE VIRTUAL FIDUCIALS FOR TRAJECTORY GUIDANCE

(71) Applicant: GM GLOBAL TECHNOLOGY OPERATIONS LLC, Detroit, MI (US)

(72) Inventors: Thomas A Seder, Fraser, MI (US); Kai-Han Chang, Farmington Hills, MI (US); Joseph F. Szczerba, Grand Blanc, MI (US); Omer Tsimhoni, Bloomfield Hills, MI (US); Paul E. Krajewski, Troy, MI (US); Bo Yu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 34 days.

(21) Appl. No.: 18/956,588

(22) Filed: Nov. 22, 2024

(65) Prior Publication Data

US 2026/0145520 A1 May 28, 2026

(51) Int. Cl.
*B60Q 1/00* (2006.01)
*B60K 35/231* (2024.01)
(Continued)

(52) U.S. Cl.
CPC .......... *B60K 35/231* (2024.01); *B60W 50/14* (2013.01); *G01S 13/867* (2013.01); (Continued)

(58) Field of Classification Search
CPC .............. B60K 35/231; B60K 2360/31; B60K 2360/785; B60W 50/14; B60W 2050/146; G01S 13/867
See application file for complete search history.

(56) References Cited

U.S. PATENT DOCUMENTS 10,215,583 B2 * 2/2019 Ng-Thow-Hing .......................... G01C 21/3658
10,591,738 B2 3/2020 Svarichevsky et al.
(Continued)

FOREIGN PATENT DOCUMENTS

DE 102011121285 A1 6/2013
DE 102016108727 A1 11/2016
(Continued)

OTHER PUBLICATIONS

German Office Action from counterpart DE1020251003866, dated Oct. 30, 2025.

*Primary Examiner* — Toan N Pham

(57) ABSTRACT

A head-up display system includes one or more sensors, a display module having a variable image plane capability, and a control module. The control module is configured to generate a coordinate system for a desired location of a vehicle with respect to an object, the coordinate system including one or more fiducials specific to the one or more sensors and location data corresponding to each fiducial, detect the vehicle approaching the object based on data from the one or more sensors, and in response to the vehicle being within a defined distance threshold of the object, control the display module to project a virtual object at a location in space based on the one or more fiducials, and dynamically change the virtual object as the vehicle moves relative to the desired location to provide trajectory guidance for a driver. Other example systems and methods are also disclosed.

20 Claims, 11 Drawing Sheets

(51) Int. Cl.
*B60W 50/14* (2020.01)
*G01S 13/86* (2006.01)

(52) U.S. Cl.
CPC .... *B60K 2360/31* (2024.01); *B60K 2360/785* (2024.01); *B60W 2050/146* (2013.01)

(56) References Cited

U.S. PATENT DOCUMENTS

| | | | | |
|---|---|---|---|---|
| 11,275,243 | B2 | 3/2022 | Chang et al. | |
| 11,536,960 | B2 | 12/2022 | Chang et al. | |
| 11,630,302 | B1 | 4/2023 | Weiss et al. | |
| 11,699,250 | B1 | 7/2023 | McCann et al. | |
| 11,766,938 | B1 | 9/2023 | Weiss et al. | |
| 12,466,422 | B2 * | 11/2025 | Rahimpour | B60W 50/14 |
| 2021/0016793 | A1 * | 1/2021 | Yamaguchi | G08G 1/165 |
| 2023/0314157 | A1 | 10/2023 | Weiss et al. | |
| 2024/0051563 | A1 * | 2/2024 | Fields | B60K 35/233 |
| 2025/0058770 | A1 * | 2/2025 | Larsson | B60W 40/09 |

FOREIGN PATENT DOCUMENTS

| | | | |
|---|---|---|---|
| DE | 102019003269 | A1 | 5/2020 |
| DE | 102022127434 | A1 | 10/2023 |

* cited by examiner

AUGMENTED REALITY VEHICLE SYSTEMS WITH HEAD-UP DISPLAY MODULES HAVING VARIABLE IMAGE PLANE CAPABILITIES TO PROVIDE VIRTUAL FIDUCIALS FOR TRAJECTORY GUIDANCE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to augmented reality vehicle systems, and more specifically to augmented reality vehicle systems with head-up display modules having variable image plane capabilities to provide virtual fiducials for trajectory guidance.

A vehicle may include a head-up display (HUD) for providing information to a driver without requiring the driver to look away from the roadway. Sometimes, a virtual image may be displayed with the HUD in a fixed viewpoint location for the driver. In some scenarios, the size of the image at the same viewpoint location may increase or decrease.

Additionally, when parking a vehicle, a driver may rely on physical fiducials to navigate the vehicle into a desired location or configuration. For example, when positioning the vehicle in a garage, the driver may rely on a tennis ball hanging from a ceiling of the garage. When the vehicle's windshield contacts the tennis ball, the driver can stop the vehicle.

SUMMARY

An augmented reality head-up display system for displaying graphics on a windshield of a vehicle, includes one or more sensors configured to detect data indicative of parameters external to the vehicle, a head-up display module having a variable image plane capability, and a control module in communication with the one or more sensors and the head-up display module. The control module is configured to generate a coordinate system for a desired location of the vehicle with respect to an object, the coordinate system including one or more fiducials specific to the one or more sensors and location data corresponding to each fiducial, detect the vehicle approaching the object based on data from the one or more sensors, and in response to the vehicle being within a defined distance threshold of the object, control the head-up display module to project a virtual object at a location in space based on the one or more fiducials, the corresponding location data, and data from the one or more sensors, and dynamically change the virtual object as the vehicle moves relative to the desired location to provide trajectory guidance for a driver of the vehicle to guide the vehicle to the desired location.

In other features, the system further includes a memory circuit in communication with the control module. The control module is configured to store the one or more fiducials and the location data corresponding to each fiducial in the memory circuit.

In other features, the control module is configured to control the head-up display module to change a color of the virtual object when the vehicle is at the desired location.

In other features, the control module is configured to control the head-up display module to increase a size of the virtual object as the vehicle approaches the desired location.

In other features, the control module is configured to control the head-up display module to change the virtual object to provide a stop indicator when the vehicle is within a defined threshold of the desired location.

In other features, the control module is configured to control the head-up display module to cause the virtual object to move when the vehicle is at the desired location.

In other features, the control module is configured to control the head-up display module to change the virtual object to indicate a closing speed alert based on data from the one or more sensors.

In other features, the control module is configured to control the head-up display module to change the virtual object to indicate a lateral alignment of the vehicle to guide the vehicle to the desired location based on data from the one or more sensors.

In other features, the control module is configured to control the head-up display module to project the desired location of the vehicle.

In other features, the system further includes an audio output module in communication with the control module. The control module is configured to control the audio output module to output an audible alert corresponding to the change in the virtual object.

In other features, the one or more sensors include a radar sensor, one or more cameras, and a GPS transceiver.

In other features, the object is one of a garage, a parking space stone, or a traffic line marking on a road.

In other features, the virtual object is a virtual tennis ball.

An augmented reality head-up display system for displaying graphics on a windshield of a vehicle, includes one or more sensors configured to detect data indicative of parameters external to the vehicle, a memory circuit, a head-up display module having a variable image plane capability, an audio output module, and a control module in communication with the one or more sensors, the memory circuit, the audio output module, and the head-up display module. The control module is configured to generate a coordinate system for a desired location of the vehicle with respect to an object, the coordinate system including one or more fiducials specific to the one or more sensors and location data corresponding to each fiducial, store the one or more fiducials and the location data corresponding to each fiducial in the memory circuit, detect the vehicle approaching the object based on data from the one or more sensors, in response to the vehicle being within a defined distance threshold of the object, control the head-up display module to project a virtual object at a location in space based on the one or more fiducials, the corresponding location data, and data from the one or more sensors, and dynamically change the virtual object as the vehicle moves relative to the desired location to provide trajectory guidance for a driver of the vehicle to guide the vehicle to the desired location, and control the audio output module to output an audible alert corresponding to the change in the virtual object.

A method for displaying an augmented reality displaying graphics on a windshield of a vehicle, includes generating a coordinate system for a desired location of the vehicle with respect to an object, the coordinate system including one or more fiducials specific to one or more sensors of the vehicle and location data corresponding to each fiducial, detecting the vehicle approaching the object based on data from the one or more sensors, and in response to the vehicle being within a defined distance threshold of the object, controlling a head-up display module of the vehicle to project a virtual object at a location in space based on the one or more fiducials, the corresponding location data, and data from the one or more sensors, and dynamically change the virtual object as the vehicle moves relative to the desired location to provide trajectory guidance for a driver of the vehicle to guide the vehicle to the desired location.

In other features, controlling the head-up display module to dynamically change the virtual object includes changing the virtual object to provide a stop indicator when the vehicle is within a defined threshold of the desired location.

In other features, controlling the head-up display module to dynamically change the virtual object includes changing the virtual object to indicate a closing speed alert based on data from the one or more sensors.

In other features, controlling the head-up display module to dynamically change the virtual object includes changing the virtual object to indicate a lateral alignment of the vehicle to guide the vehicle to the desired location based on data from the one or more sensors.

In other features, controlling the head-up display module to dynamically change the virtual object includes changing a color of the virtual object when the vehicle is at the desired location.

In other features, controlling the head-up display module to dynamically change the virtual object includes moving the virtual object when the vehicle is at the desired location.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Drivers often rely on physical fiducials to navigate vehicles into a desired configuration when parking, approaching an intersection/crosswalk, etc. For example, when positioning a vehicle in a garage, a driver may rely on a tennis ball hanging from the ceiling to indicate a desired location of the vehicle to allow for the garage door to close and have space for people to walk between the door and the vehicle. When the vehicle's windshield contacts the tennis ball, the driver can stop the vehicle. However, such physical fiducials often only indicate a vehicle depth. In other words, the driver is unable to ascertain other parameters associated with the vehicle based on physical fiducials, such as a rate of approach, a lateral position, etc. As such, a flexible, repeatable, digital solution for providing driver assistance cues for multiple vehicle parameters including a rate of approach, a lateral position, and a depth is desirable.

The augmented reality head-up display (HUD) systems and methods according to the present disclosure leverages a variable image plane capability of a HUD module in a vehicle to place a virtual object in the appropriate location of space to act as fixed location fiducial for guiding or otherwise assisting a driver to move the vehicle to a desired location. For example, and as further explained below, the systems and methods herein generate a coordinate system for the desired location with respect to an object (e.g., a garage, a parking stone, a traffic line marking on a road, etc.), where the coordinate system includes fiducials and corresponding location data specific to one or more vehicle sensors. Then, based on current sensor data from the sensors and the fiducials and corresponding location data, the systems and methods control the HUD module to project the virtual object at a location in space and then dynamically change or adjust the virtual object as the vehicle moves relative to the desired location to provide trajectory guidance for the vehicle driver to guide the vehicle to the desired location.

Figure 1:
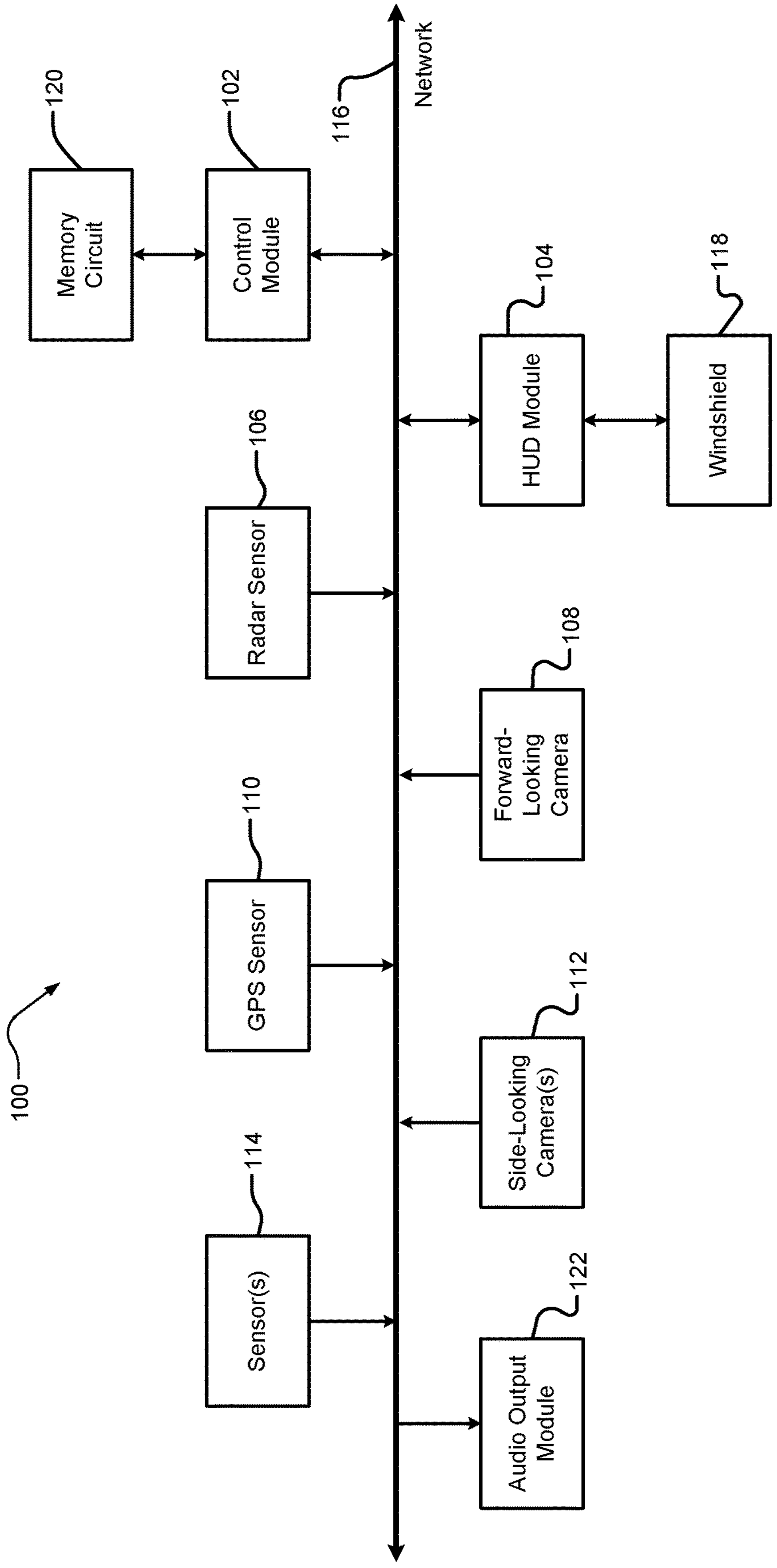
FIG. 1 is a block diagram of an example augmented reality head-up display (HUD) system for displaying graphics on a windshield of a vehicle, according to the present disclosure.

Referring now to FIG. 1, a block diagram of an example augmented reality HUD system 100 is presented for displaying graphics on a windshield of a vehicle. As shown in FIG. 1, the augmented reality HUD system 100 generally includes a control module 102, a HUD module 104, and various sensors for detecting data indicative of parameters external to the vehicle. In the example of FIG. 1, the sensors include, for example, a radar sensor 106, a forward-looking camera 108, a global positioning system (GPS) sensor (e.g., a transceiver) 110, one or more side-looking cameras 112, and other optional sensors 114. In such examples, the radar sensor 106 may be a radar-based sensor relying on radio waves and/or a LiDAR sensor relying on laser beams for detecting the presence of objects. The sensors 114 may include, for example, additional camera(s), an ambient light sensor, an inertial measurement sensor, a vehicle speed sensor, a head/eye tracker sensor (e.g., a camera), etc. In various embodiments, the cameras of the system 100 may be a short-wave infrared (SWIR) camera, a long-wave infrared (LWIR) camera, a night vision imaging system (NVIS) camera, a visual inertial system (VIS) camera, etc.

Although FIG. 1 illustrates the augmented reality HUD system 100 as including specific modules, it should be appreciated that one or more other modules may be employed if desired. Additionally, while the system 100 is shown as including multiple separate modules, any combination of the modules (e.g., the control module 102, the HUD module 104, etc.) and/or the functionality thereof may be integrated into one or more modules. Further, although the system 100 of FIG. 1 is shown as including particular sensors, it should be appreciated that the system 100 and/or other systems may include more or less sensors, sensors having different functionalities, etc. For instance, the system 100 may include multiple radar sensors, multiple forward-looking cameras, etc. if desired.

In various embodiments, the modules and sensors of the system 100 may be in communication with each other and may share parameters via a network 116, such as a controller area network (CAN). In such examples, the parameters may be shared via one or more data buses of the network 116. As such, various parameters may be made available by a given module and/or sensor to other modules and/or sensors via the network 116.

Figure 2:
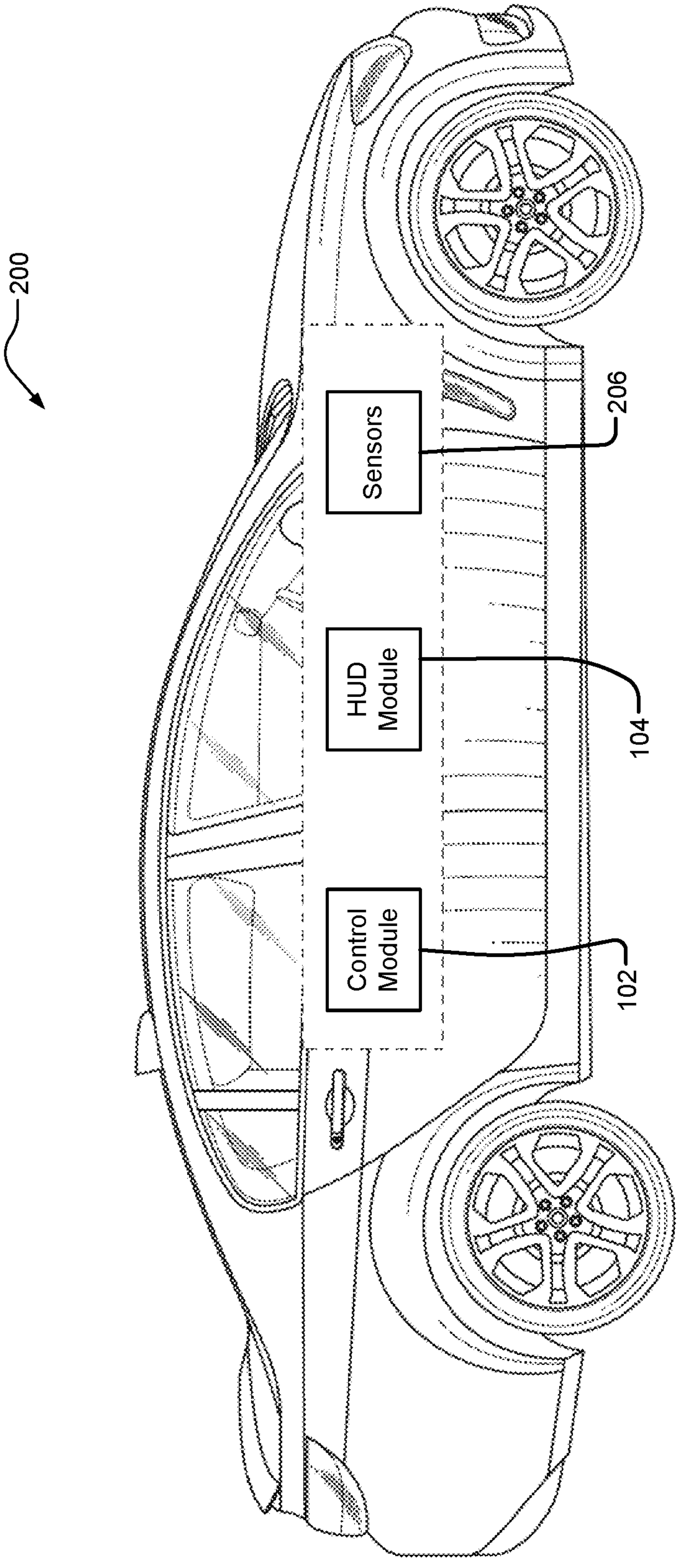
FIG. 2 is a vehicle including portions of the augmented reality HUD system of FIG. 1, according to the present disclosure.

The augmented reality HUD system 100 of FIG. 1 may be employable in any suitable vehicle, such as an electric vehicle (e.g., a pure electric vehicle, a plug-in hybrid electric vehicle, etc.), an internal combustion engine vehicle, etc. Additionally, the system 100 may be applicable to an autonomous vehicle, a semi-autonomous vehicle, etc. For example, FIG. 2 depicts a vehicle 200 including the control module 102 of FIG. 1, the HUD module 104 of FIG. 1, and sensors 206. In such examples, the sensors 206 may include any one or more of the sensors of FIG. 1.

With continued reference to FIG. 1, the HUD module 104 generally projects images onto a windshield 118 of the vehicle (e.g., the vehicle 200) and in the driver's line of sight. In the example of FIG. 1, the HUD module 104 has a variable image plane capability. For example, when projecting a virtual object or image, the HUD module 104 can focus the virtual object or image at one of multiple different image planes at one of multiple different distances from the driver, thereby creating the impression of the virtual object being placed at a fixed position in space (e.g., at a distance from the driver). Then, the HUD module 104 can focus the virtual object at another image plane at another distance from the driver and change the size of the virtual object, thereby causing the virtual object to appear closer or further away from the driver (and at another fixed position in space).

Figure 3:
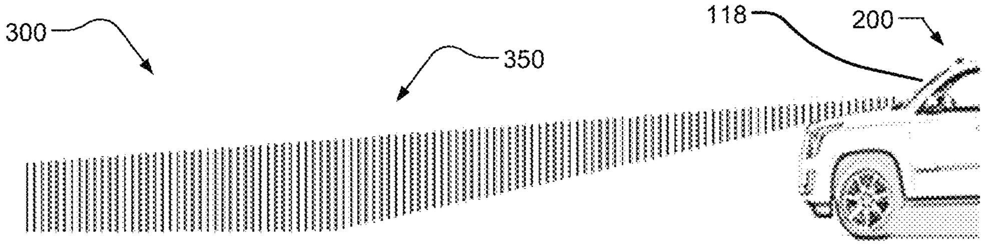
FIGS. 3-4 are block diagrams of an example system including a HUD module having a variable image plane capability, according to the present disclosure.
Figure 4:
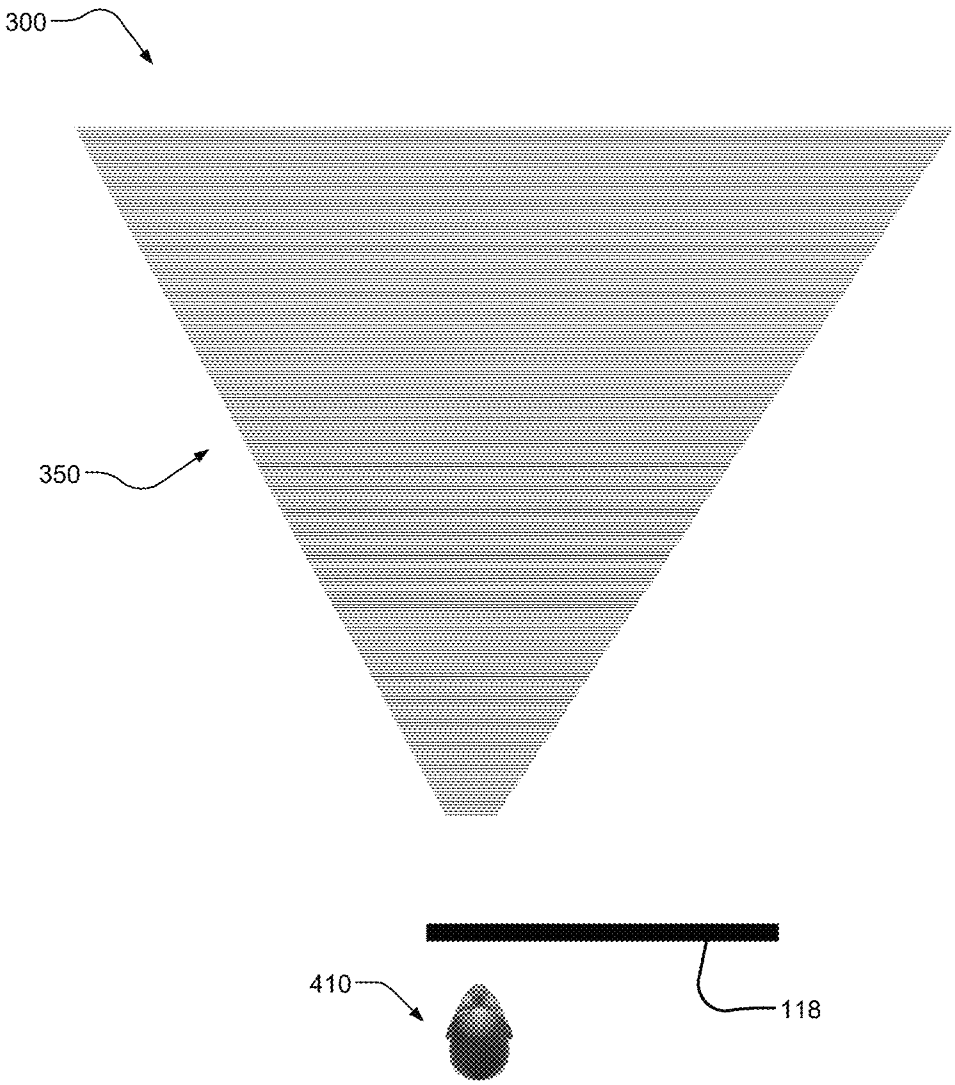

As one example, FIGS. 3-4 depict an example system 300 including the vehicle 200, in which the HUD module 104 of FIG. 1 has a variable image plane capability. In such examples, the HUD module 104 is able to project a virtual object at a fixed position in space (e.g., beyond the windshield 118). As shown in FIGS. 3-4, the HUD module 104 can project (e.g., focus) the virtual object at any one of multiple planes 350. In various embodiments, the HUD module 104 can project the virtual object within any one of the volumes defined by adjacent planes 350. In some examples, the planes 350 may extend any suitable distance from a driver 410 (e.g., from the driver's eye). For example, the plane closest to the driver 410 may be at a distance of 40 cm, 80 cm, 1 m, 2 m, 2.3 m, 2.5 m, or another suitable distance from the driver 410. Additionally, the plane furthest from the driver 410 may be 90 m, 100 m, 150 m, 200 m, or another suitable distance from the driver 410. In some other examples, the plane furthest from the driver 410 may extend an infinite distance, a distance depending on the driver's eyesight, etc.

In various embodiments, the augmented reality HUD system 100 of FIG. 1 may establish a coordinate system of the vehicle at a desired location or configuration. For example, in the example of FIG. 1, the control module 102 generates the coordinate system for the desired vehicle location with respect to an object, such as a garage, a parking space stone, a traffic line marking on a road, etc. In such examples, the coordinate system includes one or more fiducials specific to at least some of the sensors of FIG. 1 (e.g., the radar sensor 106, the forward-looking camera 108, the GPS sensor 110, the side-looking camera(s) 112, etc.) and location data corresponding to each fiducial.

For example, the control module 102 may identify a particular fiducial (e.g., a reference point) for the forward-looking camera 108 and corresponding location data for that fiducial. As one example, a distance from the forward-looking camera 108 to a wall, a door edge, a floor expansion joint, and/or another fiducial in a garage may be determined with respect to the desired location or configuration of the vehicle in the garage. In such examples, the control module 102 ties a specific distance (e.g., location data) to the wall, the door edge, the floor expansion joint, etc. for the desired vehicle location with the forward-looking camera 108. This fiducial and location identification with respect the desired vehicle location may be performed for any one of the sensors of FIG. 1. Then, with each fiducial and corresponding location data, the control module 102 can establish the coordinate system of a properly configured vehicle in the garage or with respect to another object.

Figure 5:
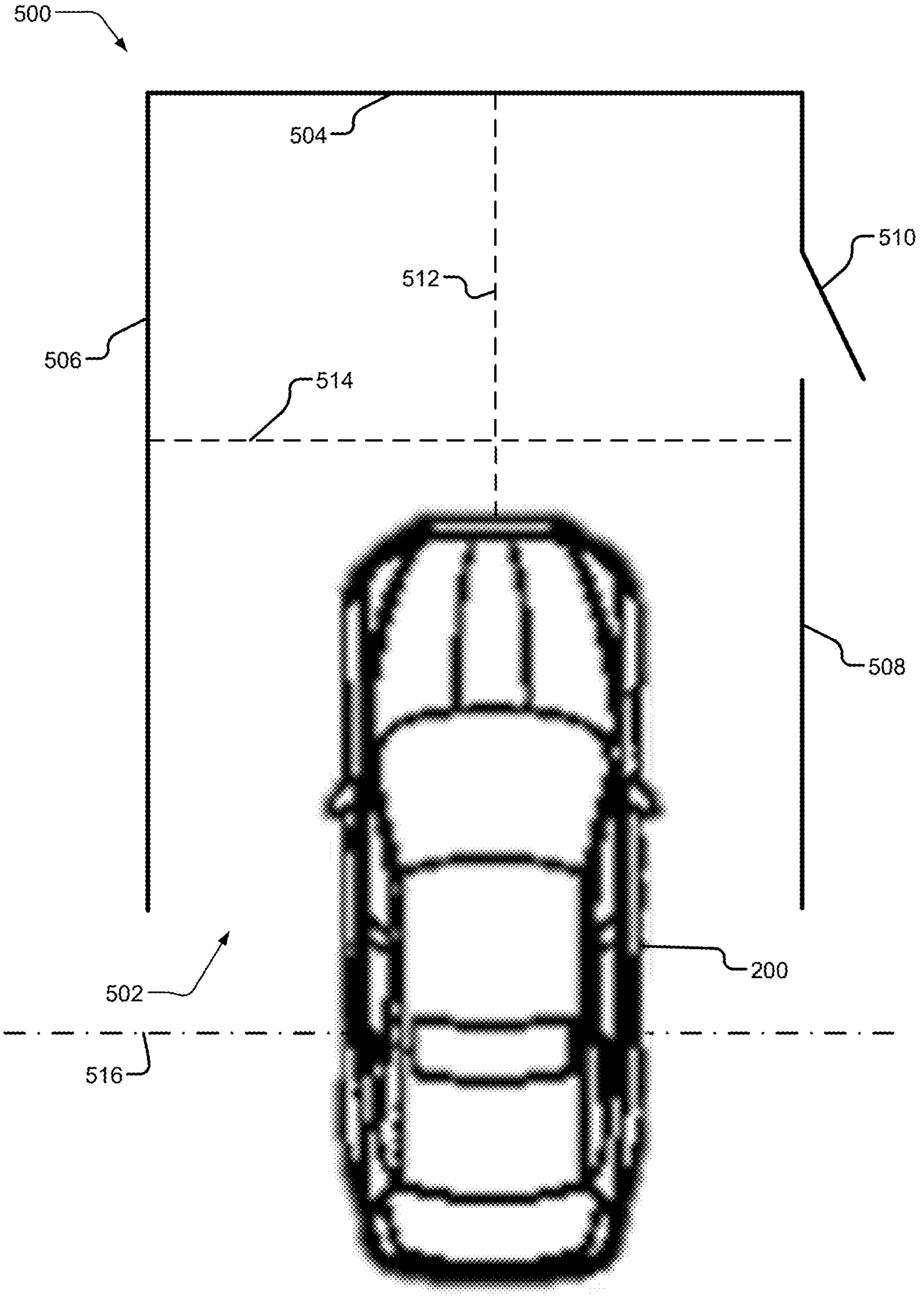
FIG. 5 is a block diagram of an example system including the vehicle of FIG. 2 and a garage, according to the present disclosure.

In various embodiments, the coordinate system may be established through a calibration process. For example, FIG. 5 depicts one example of a system 500 including the vehicle 200 of FIG. 2 and a garage 502 for housing the vehicle 200. As shown in FIG. 5, the garage 502 includes a front wall 504, side walls 506, 508, a door 510, and two floor expansion joints 512, 514. In this example, the vehicle 200 may be positioned in a desired location or configuration within the garage 502 and then the control module 102 may enter a calibration or set-up mode via, for example, user input. In this mode, the control module 102 generates the coordinate system for the current (desired) location of the vehicle 200 with respect to the garage 502 by identifying particular fiducials specific to one or more of the radar sensor 106, the forward-looking camera 108, the side-looking camera(s) 112, etc. and location data corresponding to each fiducial. More specifically, when the vehicle 200 is in its desired location within the garage 502, the various sensors may be activated to identify specific reference points and distances to the points from the vehicle 200 (or the sensors). Then, at a later time, the control module 102 may rely on the coordinate system including the identified fiducials and corresponding location data to assist a driver to park the vehicle 200 in the desired location within the garage 502, as further explained below.

In other examples, the coordinate system may be established in real time. This may be useful when the vehicle 200 approaches a parking stone, approaches a traffic line marking on a road (e.g., a crosswalk line, a stop sign line, etc.), approaches a parking spot, is backing out of a space (e.g., the garage 502, a parking spot, etc.), is backing a boat into a lake, is attempting to align with and attached to a trailer, etc. For instance, when approaching an intersection, a road marking, a parking stone, etc., the control module 102 may generate the coordinate system for a desired location of the vehicle 200 with respect to the intersection, the road marking, the parking stone, etc. by identifying particular fiducials specific to one or more of the radar sensor 106, the forward-looking camera 108, the side-looking camera(s) 112, etc. and location data corresponding to each fiducial, as explained above. In such examples, the desired location may be estimated based on received sensor data.

With continued reference to FIG. 1, the control module 102 may store the identified fiducials and corresponding location data in memory for future use. For example, and as shown in FIG. 1, the augmented reality HUD system 100 includes a memory circuit 120 in communication with the control module 102. In such examples, the memory circuit 120 may be located external to the control module 102 for storing the identified fiducial(s) and corresponding location data specific each sensor, as shown in FIG. 1. In other examples, the memory circuit 120 may be located internal to the control module 102 if desired.

In various embodiments, the control module 102 of FIG. 1 may detect whether the vehicle (e.g., the vehicle 200) is approaching the object based on data from the radar sensor 106, the forward-looking camera 108, the side-looking camera(s), the sensors 114, etc. For example, with continued reference to FIG. 5, the control module 102 may detect when the vehicle 200 is within a defined distance from the garage 502 (e.g., a stored coordinate of the garage 502). For instance, in FIG. 5, the control module 102 may detect the vehicle 200 approaching the garage 502 when the vehicle 200 comes within 8 meters, 10 meters, 12 meters, and/or another suitable distance threshold from an entrance of the garage 502, as indicated by dashed line 516. In other examples, the control module 102 may likewise detect the vehicle 200 approaching a parking stone, a traffic line marking on a road, etc.

Then, in response to the vehicle being within a defined distance threshold of the object, the control module 102 may control the HUD module 104 to project a virtual object at a location in space. In such examples, the virtual object is projected by the HUD module 104 based on the identified fiducials and corresponding location data and present data from the radar sensor 106, the forward-looking camera 108, the side-looking camera(s), the sensors 114, etc. For example, the control module 102 may compare newly received data from each sensor to an identified fiducial and corresponding location data specific to that sensor. In some examples, the fiducial and corresponding location data may be retrieved from the memory circuit 120. Then, based on the comparisons, the control module 102 can generate and transmit one or more control signals to the HUD module 104. In turn, the HUD module 104 projects the virtual object at the location in space, which may provide instructions to the driver to navigate the vehicle to the desired location or configuration. In such examples, the HUD module 104 may focus the virtual object at one of multiple different image planes at one of multiple different distances from the driver, as explained above.

In various embodiments, the virtual object may be any suitable displayed object to assist the driver. For example, the virtual object may be a tennis ball or another circular object. In other examples, the virtual object may be a rectangular object, a triangular object, etc.

Next, the control module 102 may control the HUD module 104 to dynamically change the virtual object as the vehicle moves relative to the desired location to provide trajectory guidance for the vehicle driver to guide the vehicle to the desired location or configuration. For example, as the vehicle moves, the control module 102 may receive new data from each sensor and then compare that data to the identified fiducial and corresponding location data specific to that sensor. Based on the comparisons, the control module 102 can generate and transmit additional control signal(s) to the HUD module 104, thereby causing the virtual object to change (e.g., move to another location in space). In doing so, the virtual object can provide trajectory guidance for the vehicle driver to guide the vehicle to the desired location or configuration, as further explained below.

Figure 6:
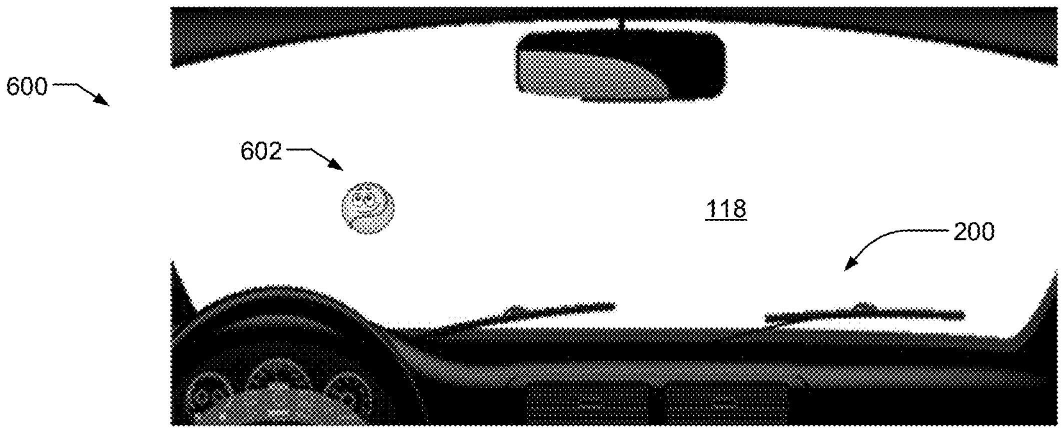
FIGS. 6-10 are block diagrams of example virtual tennis balls that dynamically change based on movement of a vehicle relative to a desired location, according to the present disclosure.
Figure 7:
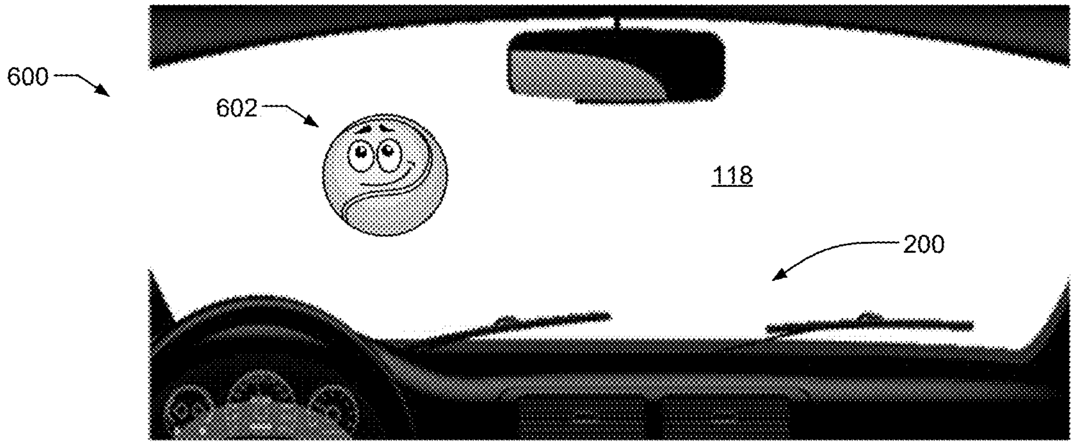

The virtual object may change in one or more aspects based on the movement of the vehicle, such as in size, shape, location, color, expressions, etc. For example, FIGS. 6-7 depict one example system 600 in which a virtual object is increased in size as the vehicle 200 of FIG. 2 approaches a desired location. More specifically, in FIG. 6, the control module 102 of FIG. 1 controls the HUD module 104 to project a virtual tennis ball 602 on the windshield 118 at a location in space (e.g., at one image plane at a distance from the driver). Then, in FIG. 7, as the vehicle 200 is moving closer to the desired location, the control module 102 controls the HUD module 104 to dynamically increases the size of the virtual tennis ball 602. In doing so, the HUD module 104 can project a larger version of the virtual tennis ball 602 at another image plane at a shorter distance from the driver, thereby causing the virtual object to appear closer to the driver.

Figure 8:
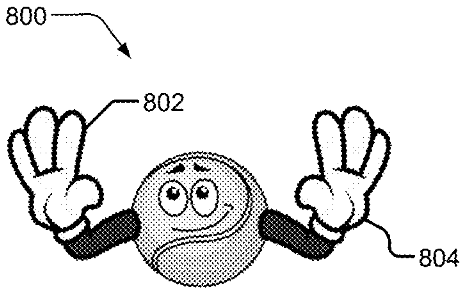

In some examples, the virtual object may change to display a stop indicator when the vehicle is within a defined threshold of the desired location. For example, FIG. 8 depicts an example virtual object in the form of a tennis ball 800 having hands 802, 804 positioned to portray a stop indicator. In various embodiments, the HUD module 104 may focus the tennis ball 800 at one of the image planes at a distance from the driver of the vehicle 200, as explained above. In such examples, the HUD module 104 may project the tennis ball 800 onto the windshield 118 when the vehicle 200 is within 5 centimeters, 10 centimeters, 50 centimeters, 1 meter, etc. of the desired location.

Additionally, in some embodiments, the virtual object may move when the vehicle 200 is within the defined threshold of or at the desired location. In such examples, the tennis ball 800 of FIG. 8 and/or another suitable virtual object may bounce (e.g., like a tennis ball) on the windshield 118 when the vehicle 200 reaches the desired location.

In other embodiments, the HUD module 104 may change the virtual object to indicate a closing speed alert based on data from the radar sensor 106, the forward-looking camera 108, the side-looking camera(s), the sensors 114, etc. For example, the control module 102 may receive data from one or more of the radar sensor 106, the forward-looking camera 108, the side-looking camera(s), the sensors 114, etc. and then determine a rate of change based on the received data. If the rate of change exceeds a defined threshold, the control module 102 controls the HUD module 104 to change the virtual object to indicate a closing speed alert. In such examples, the control module 102 may rely on the radar sensor 106 to determine a rate of positional change of the vehicle over time (dx/dt), the forward-looking camera 108 to determine a rate of fiducial perspective change over time, etc.

Figure 9:
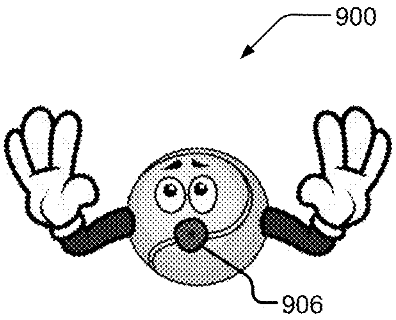

Once the defined threshold is met, the HUD module 104 may change the virtual object to indicate the need to slow down. For example, FIG. 9 depicts an example virtual object in the form of a tennis ball 900 having similar characteristics as the tennis ball 800 of FIG. 8, but with a facial expression to indicate the need to slow down. Specifically, in the example of FIG. 9, the tennis ball 900 is shown as having a mouth 906 opened with a cautious expression. In some examples, the HUD module 104 may also project a message (e.g., "You're Coming In Hot!", "Slow Down", etc.) in conjunction with the facial expression.

Figure 10:
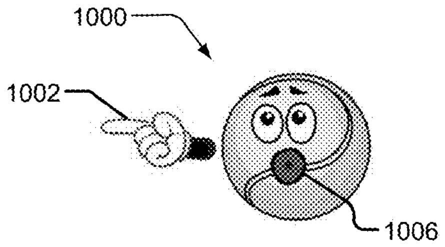

Additionally, in some embodiments, the virtual object may change to indicate a lateral alignment of the vehicle 200 to guide the vehicle 200 to the desired location based on data from the radar sensor 106, the forward-looking camera 108, the side-looking camera(s), the sensors 114, etc. For example, the control module 102 may receive data from one or more of the radar sensor 106, the forward-looking camera 108, the side-looking camera(s), the sensors 114, etc. and then determines if a current position of the vehicle 200 is offset to the left or right of the desired location. To make this determination, the control module 102 may compare the received (present time) data to the identified fiducials and corresponding location data as explained above. As one example, FIG. 10 depicts an example virtual object in the form of a tennis ball 1000 having similar characteristics as the tennis ball 800 of FIG. 8, but with a hand 1002 pointing to the left indicating a need for the driver to move the vehicle 200 to the left. Additionally, in the example of FIG. 10, the tennis ball 1000 is shown as having a mouth 1006 opened to indicate a message to the driver. For instance, the HUD module 104 may project a message, such as "A Bit To The Left", etc. with the tennis ball 1000.

Figure 11:
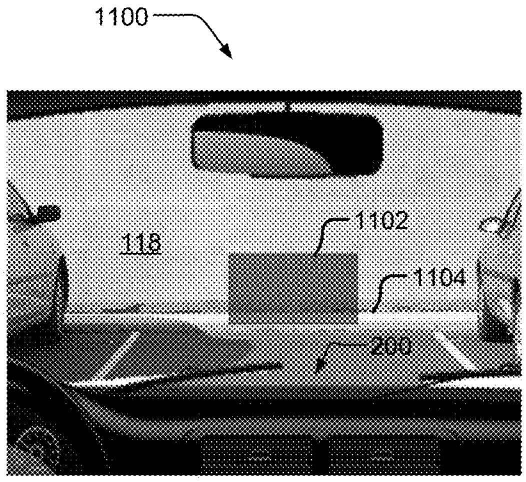
FIGS. 11-13 are block diagrams of example virtual rectangular objects that dynamically change based on movement of a vehicle relative to a desired location, according to the present disclosure.
Figure 12:
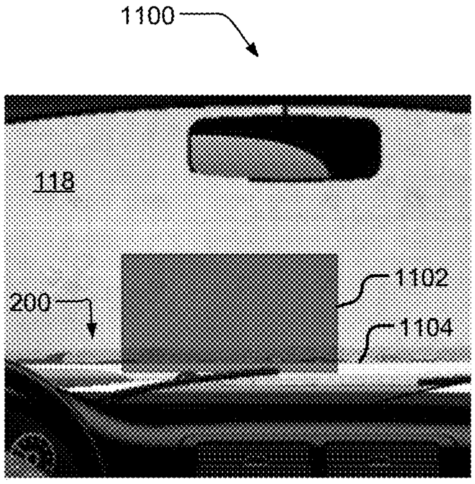

In various embodiments, the virtual object may change also change color when the vehicle is within a defined threshold of or at the desired location. For example, FIGS. 11-12 depict one example system 1100 in which a virtual object 1102 is increased in size and changes color when the vehicle 200 of FIG. 2 reaches a desired location with respect to a parking space stone 1104. Specifically, the virtual object 1102 of FIG. 11 may be one color (e.g., green, blue, yellow, etc.) and the virtual object 1102 may be one color (e.g., green, blue, yellow, etc.), and the virtual object 1102 of FIG. 12 may be another color (e.g., red, purple, etc.) and larger in size than the virtual object 1102 of FIG. 11. In such examples, the control module 102 of FIG. 1 controls the HUD module 104 to project the virtual object 1102 of FIG. 11 on the windshield 118 and focus the virtual object 1102 at one image plane at a distance from the driver, and then controls the HUD module 104 to project the virtual object 1102 of FIG. 12 on the windshield 118 and focus the virtual object 1102 at another image plane at another distance from the driver, as explained above.

Figure 13:
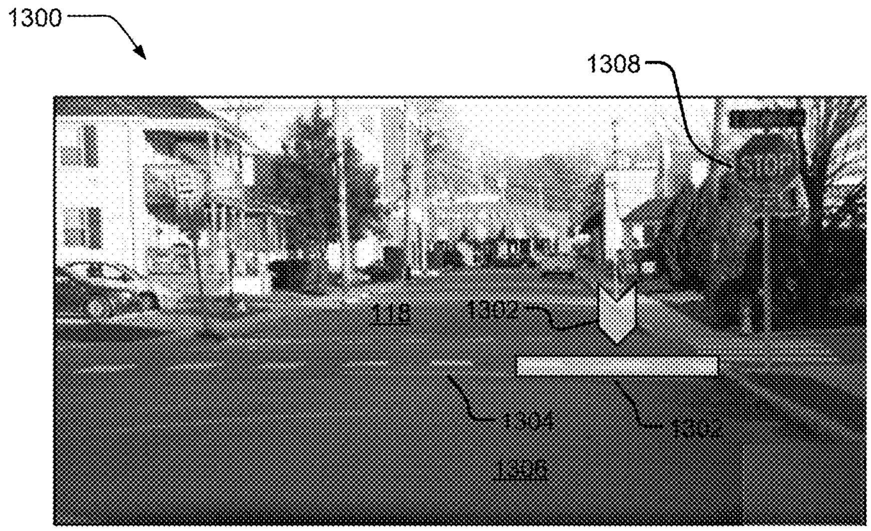
Figure 14:
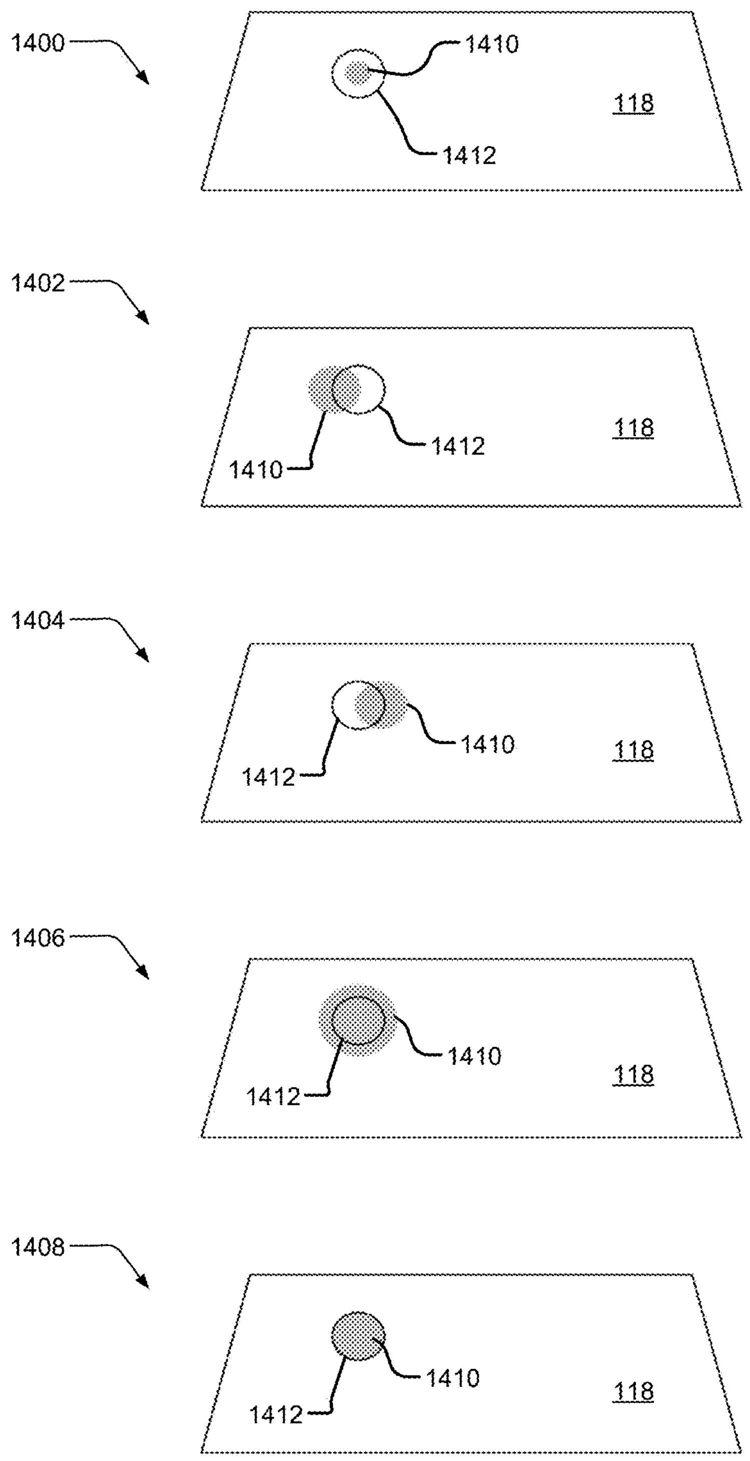
FIG. 14 is a block diagram of example scenarios in which a virtual object and a desired location are provided on a vehicle windshield based on aviator type control, according to the present disclosure.

As another example, FIG. 13 depicts a system 1300 in which a virtual object 1302 may increase in size and change color when the vehicle 200 of FIG. 2 reaches a desired location with respect to a traffic line 1304 on a road 1306. As shown, the virtual object 1302 of FIG. 13 includes a rectangular object projected on the traffic line 1304 and an arrow pointing towards the rectangular object (and the traffic line 1304). In this example, the traffic line 1304 is a marking for a stop sign 1308. Similar to the virtual object 1102 of FIGS. 11-12, the virtual object 1302 of FIG. 13 may change color (e.g., from green to red) when the vehicle 200 reaches the traffic line 1304 and become increasing larger as the vehicle 200 approaches the traffic line 1304. In such examples, the control module 102 of FIG. 1 controls the HUD module 104 to project the virtual object 1302 on the windshield 118 and focus the virtual object 1302 at different image planes as explained above.

With continued reference to FIG. 1, an audible alert corresponding to the change in the virtual object may be provided to the driver. For example, and as shown in FIG. 1, the augmented reality HUD system 100 includes an audio output module 122 in communication with the control module 102. In such examples, the audio output module 122 may be a speaker and/or another suitable device capable of outputting audio. In such examples, the control module 102 may generate and transmit one or more control signals to the audio output module 122. In turn, the audio output module 122 may output an audible alert corresponding to the change in the virtual object. In some examples, the audible alert may include, for example, "You're Coming In Hot!", "Slow Down", "A Bit To The Left", "A Bit To The Right", etc. In other examples, the audible alert may include the sound of a bouncing ball when the vehicle 200 reaches the desired location.

In various embodiments, the HUD module 104 may project the desired location on the windshield 118, along with the virtual object. This may enable an aviator type control feedback and response for the driver. For example, FIG. 13 depicts a collection of different scenarios 1400, 1402, 1404, 1406, 1408 in which a virtual object 1410 and a desired location 1412 are projected on the windshield 118 based on aviator type control (and focused at different image planes as explained above).

Specifically, in the scenario 1400, the virtual object 1410 is shown as being centered on and smaller than the desired location 1412. This indicates to the driver that the vehicle is too far away from the desired location 1412 and to keep moving forward at the same heading. In the scenario 1402, the virtual object 1410 is shown as being generally the same size as, but to the left of the desired location 1412. This indicates to the driver that the vehicle is too much to the right and to stir to the left to reach the desired location 1412. Conversely, in the scenario 1404, the virtual object 1410 is shown as being generally the same size as, but to the right of the desired location 1412 to indicate the vehicle is too much to the left and to stir to the right. In the scenario 1406, the virtual object 1410 is shown as being centered on and larger than the desired location 1412 to indicate the vehicle 20 is too close and to move back. Lastly, in the scenario 1408, the virtual object 1410 is shown as being generally the same size as and centered on the desired location 1412, indicating the vehicle 200 has a suitable distance and alignment with respect to the desired location 1412.

While the examples herein are related to projecting virtual objects with the HUD module 104, it should be appreciated that any one of the virtual objects herein may be extended to a head-down display module if desired. For example, if desired, any one of the virtual objects of FIGS. 6-14 may also be provided on a console display in the vehicle.

Figure 15:
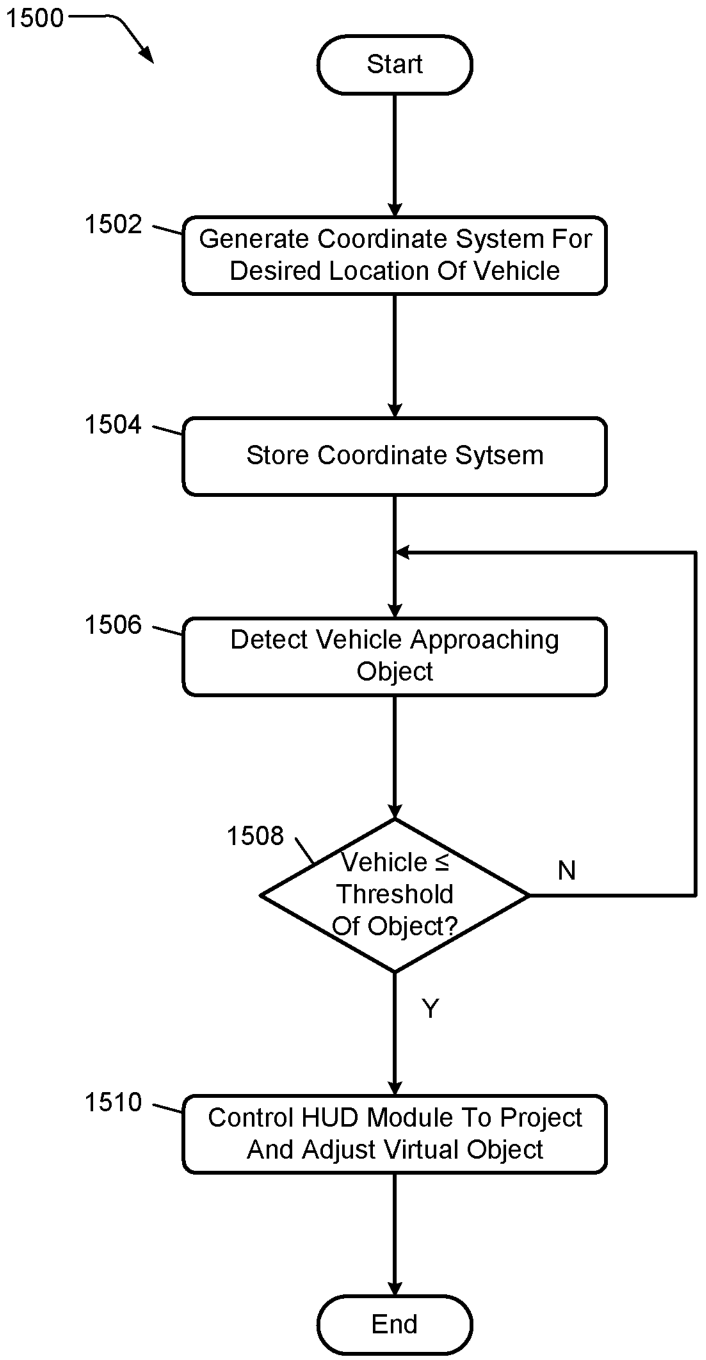
FIGS. 15-17 are flowcharts of example control processes for displaying graphics on a windshield of a vehicle, according to the present disclosure.
Figure 16:
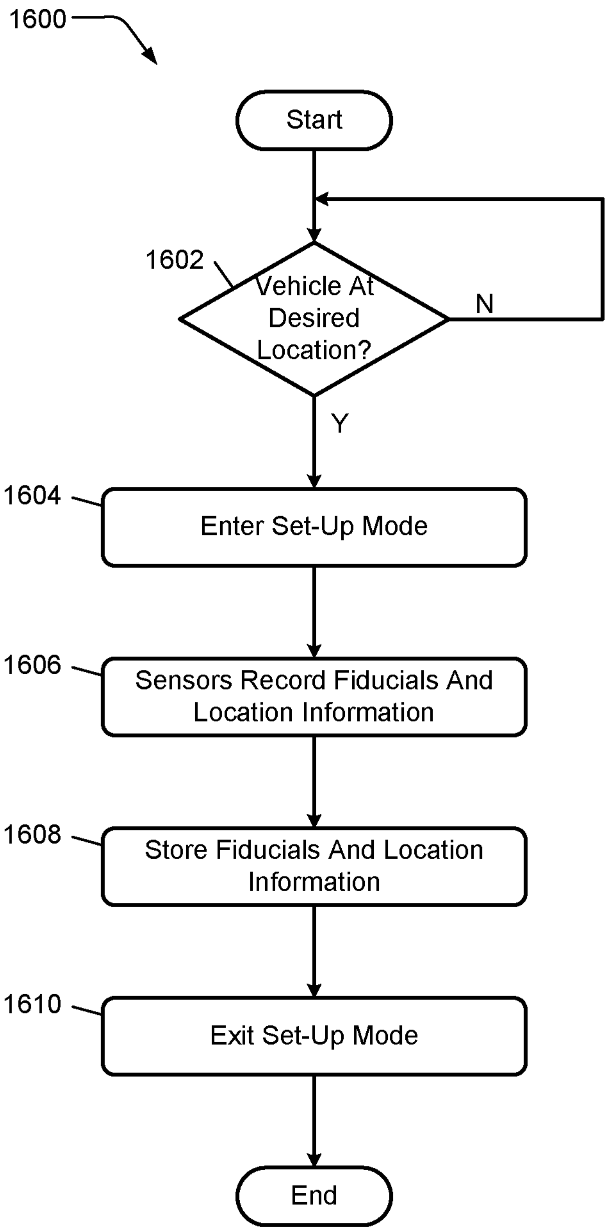
Figure 17:
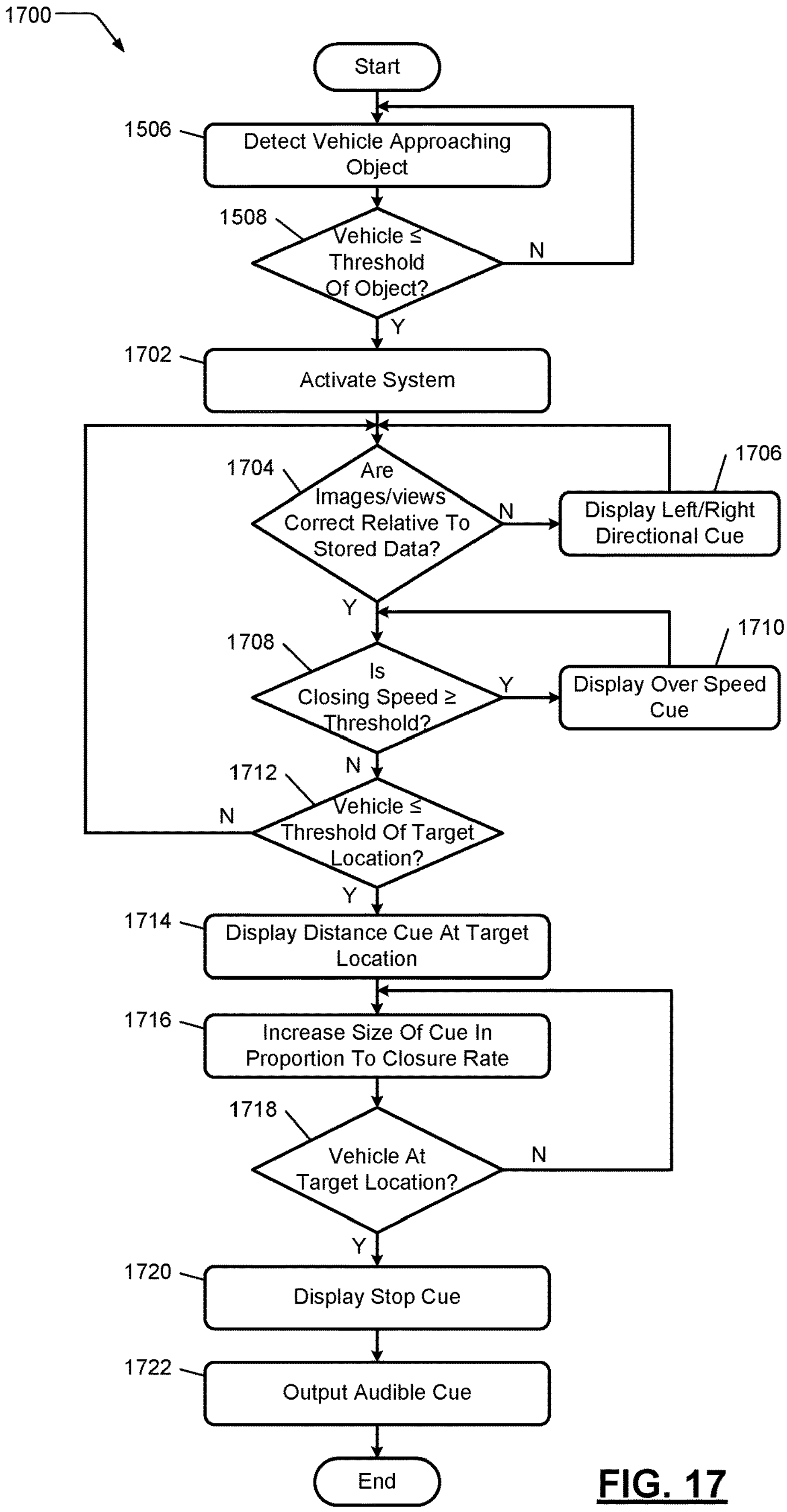

FIGS. 15-17 illustrate example control methods 1500, 1600, 1700 employable by the augmented reality HUD system 100 of FIG. 1 for displaying graphics on a windshield of a vehicle, such as the windshield 118 of the vehicle 200. Although the example control methods 1500, 1600, 1700 are described in relation to the augmented reality HUD system 100 of FIG. 1 including the control module 102, the HUD module 104, etc., any one of the control methods 1500, 1600, 1700 may be employable by another suitable system and/or module.

As shown in FIG. 15, the control method 1500 begins at 1502 by generating a coordinate system for a desired location of the vehicle 200 with respect to an object, such as the garage 502 of FIG. 5, the parking space stone 1104 of FIGS. 11-12, the traffic line 1304 of FIG. 13, etc. For example, and as explained above, the control module 102 may generate the coordinate system for the desired vehicle location by identifying fiducials specific to the radar sensor 106, the forward-looking camera 108, the side-looking camera(s) 112, etc. and location data corresponding to each fiducial. In such examples, the coordinate system may be established through a calibration process and/or in real time, as explained above. Then, at 1504, the control module 102 may store the coordinate system including the identified fiducials and corresponding location data in memory, such as the memory circuit 120 of FIG. 1. The control method 1500 then proceeds to 1506.

At 1506, the control module 102 detects whether the vehicle 200 is approaching the object. For instance, the control module 102 may receive data from the GPS sensor 110, the radar sensor 106, the forward-looking camera 108, the side-looking camera(s), the sensors 114, etc., and then detect whether the vehicle 200 is near the garage 502 of FIG. 5, the parking space stone 1104 of FIGS. 11-12, the traffic line 1304 of FIG. 13, etc. The control method 1500 then proceeds to 1508, where the control module 102 determines whether the vehicle 200 is less than or equal to a defined threshold from the object. In such examples, the defined threshold may be any suitable distance, such as 8 meters, 10 meters, 12 meters, etc. If no at 1508, the control method 1500 returns to 1508. If yes at 1508, the control method 1500 proceeds to 1510.

At 1510, the control module 102 detects controls the HUD module 104 to project a virtual object at a location in space and then to dynamically change or adjust the virtual object as the vehicle 200 moves relative to the desired location. In various embodiments, the virtual object may be originally projected and adjusted by the HUD module 104 based on the identified fiducials and corresponding location data and present data from the radar sensor 106, the forward-looking camera 108, the side-looking camera(s), the sensors 114, etc. In such examples, and as explained above, the control module 102 may compare newly received data from each sensor to an identified fiducial and corresponding location data specific to that sensor, and then, based on the comparisons, the HUD module 104 may project the virtual object on the windshield 118 and focus the virtual object at one of multiple different image planes at one of multiple different distances from the driver. The control method 1500 then ends as shown in FIG. 15.

In FIG. 16, the control method 1600 is a calibration process implemented to generate a coordinate system for a desired location of the vehicle 200 with respect to an object. As such, the control method 1600 may be employed as one example of the step 1502 of FIG. 15. As shown in FIG. 16, the control method 1600 begins at 1602 by determining whether the vehicle 200 is at a desired location with respect to an object, such as the garage 502 of FIG. 5, the parking space stone 1104 of FIGS. 11-12, the traffic line 1304 of FIG. 13, etc. For example, the vehicle 200 may be positioned in the garage 502 of FIG. 5. Then, a driver or another user may select an input indicating the vehicle 200 is in a desired location. If no at 1602, the control method 1600 returns to 1602. If yes at 1602, the control method 1600 proceeds to 1604, where the control module 102 enters a set-up mode. In such examples, the driver or another user may select an input to cause the control module 102 to enter the set-up mode. The control method 1600 then proceeds to 1606.

At 1606, the control module 102 activates sensors of the vehicle 200, such as the radar sensor 106, the forward-looking camera 108, the side-looking camera(s) 112, etc. In doing so, the control module 102 records or otherwise identifies particular fiducials specific to one or more of the radar sensor 106, the forward-looking camera 108, the side-looking camera(s) 112, etc. and location data corresponding to each fiducial, as explained above. For example, the various sensors may be activated to identify specific reference points associated with object and distances to the points from the vehicle 200 (or the sensors), as explained above. Then, the control method 1600 proceeds to 1608, where the identified fiducials and corresponding location data specific to each sensor is stored in memory, such as the memory circuit 120 of FIG. 1. The control method 1600 then proceeds to 1610, where the control module 102 exits the set-up mode automatically or via user input. The control method 1600 then ends as shown in FIG. 16.

In FIG. 17, the control method 1700 may be implemented after, for example, identified fiducials and corresponding location data specific to each sensor are stored (e.g., after step 1608 of FIG. 16). As shown, the control method 1700 begins at 1506, 1508 of FIG. 15 where the control module 102 detects whether the vehicle 200 is approaching an object (e.g., the garage 502, etc.) and then determines whether the vehicle 200 is less than or equal to a defined threshold from the object, as explained above. If no at 1508, the control method 1700 returns to 1508. If yes at 1508, the control method 1700 proceeds to 1702.

At 1702, a system (e.g., the augmented reality HUD system 100 of FIG. 1) is activated for displaying graphics on the windshield 118 of the vehicle 200. The control method 1700 then proceeds to 1704. At 1704, the control module 102 determines whether images and/or views received from and/or generated based on the camera(s) 108, 112 are perspectively correct relative to the stored fiducials and corresponding location data for the camera(s) 108, 112. For example, the control module 102 may compare newly received data from the camera(s) 108, 112 to retrieved fiducials and corresponding location data specific to the camera(s) 108, 112 to make determine if the vehicle 200 is correctly aligned. If no at 1704, the control method 1700 proceeds to 1706, where the control module 102 controls the HUD module 104 to display or otherwise project a left or right direction cue, such as a virtual object pointing to the left or right as described above. If yes at 1704, the control method 1700 proceeds to 1708.

At 1708, the control module 102 determines whether a closing speed of the vehicle 200 is greater than or equal to a defined threshold. For example, and as explained above, the control module 102 may determine a rate of positional change of the vehicle 200 over time (dx/dt) and/or a rate of fiducial perspective change over time based on received data from one or more of the radar sensor 106, the forward-looking camera 108, the side-looking camera(s), the sensors 114, etc. If yes at 1708, the control method 1700 proceeds to 1710, where the control module 102 controls the HUD module 104 to display or otherwise project a speed cue, such as a virtual object indicating the need to slow down as described above. If no at 1708, the control method 1700 proceeds to 1712.

At 1712, the control module 102 determines whether the vehicle 200 is less or equal to a defined threshold (e.g., 2 meters, 3 meters, 4 meters, etc.) of a target (e.g., desired) location. This determination may be made based on received data from one or more of the radar sensor 106, the forward-looking camera 108, the GPS sensor 110, the side-looking camera(s), the sensors 114, etc. and/or the stored fiducials and corresponding location data. If no at 1712, the control method 1700 returns to 1704. If yes at 1712, the control method 1700 proceeds to 1714, where the control module 102 controls the HUD module 104 to display or otherwise project a distance cue, such as a virtual tennis ball, as described above. The control method then 1700 proceeds to 1716.

At 1716, the control module 102 adjusts the size of the distance cue. For example, the control module 102 may increase the size of the virtual tennis ball in proportion to a closure rate of the vehicle 200 arriving at the target location. In such examples, the control module 102 may determine the closure based on, for example, the closing speed, the target location, etc. The control method 1700 then proceeds to 1718.

At 1718, the control module 102 determines whether the vehicle 200 is at the target (e.g., desired) location. This determination may be made based on received data from one or more of the radar sensor 106, the forward-looking camera 108, the GPS sensor 110, the side-looking camera(s), the sensors 114, etc. and/or the stored fiducials and corresponding location data. If no at 1718, the control method 1700 returns to 1716. If yes at 1718, the control method 1700 proceeds to 1720, where the control module 102 controls the HUD module 104 to display or otherwise project a stop cue, such as a virtual object indicating the need to stop, as described above. The control method 1700 then proceeds to 1722.

At 1722, the control module 102 control the audio output module 122 to output an audible alert. For example, and as explained above, the audio output module 122 may output an audible alert indicating the vehicle 200 has reached the target location, a sound of a bouncing ball, etc. The control method 1700 then ends as shown in FIG. 17.

Figure 18:
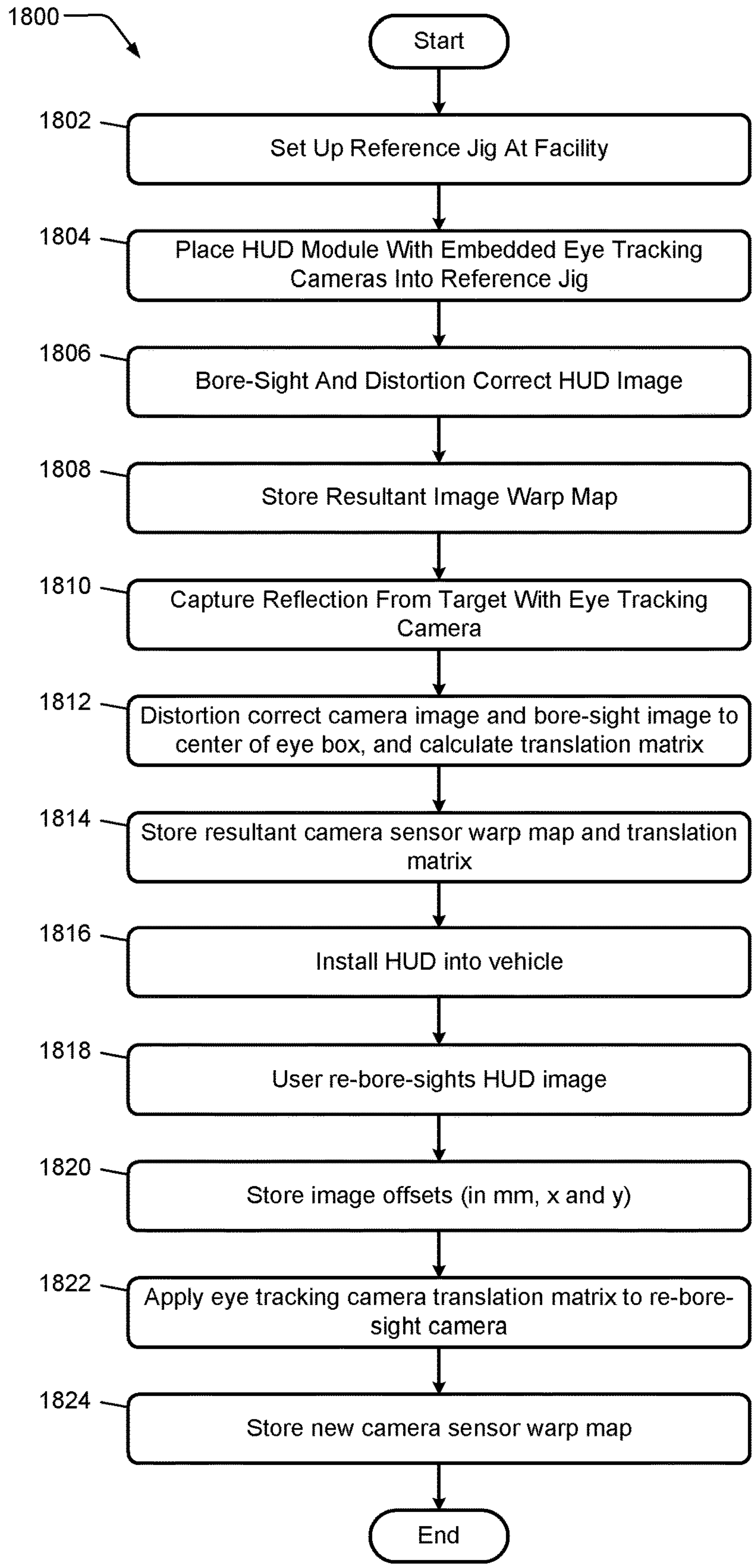
FIG. 18 is a flowchart of example process for calibrating a heads-up display module to display graphics on a windshield of a vehicle, according to the present disclosure, according to the present disclosure.

FIG. 18 illustrates an example control method 1800 employable for calibrating a HUD module, such as the HUD module 104 of FIG. 1 to enable the HUD module to display graphics on the windshield 118 of the vehicle 200. As shown, the control method 1800 begins at 1802 where a reference jig is set up in a facility. In such examples, the reference jig may include, for example, a reference windshield at a design location, a reference HUD bracket at a design location, an infrared (IR) reflective target at a center of an eyellipse (e.g., a statistical representation of a location the driver's eyes), and an IR emitter aimed at the IR reflective target. The control method 1800 then proceeds to 1804.

At 1804, a HUD module (e.g., the HUD module 104) is placed into the reference jig. In such examples, the HUD module may be a newly built module having one or more embedded eye tracking cameras. The control method 1800 then proceeds to 1806, where a boresight and distortion correct HUD image process is implemented. Then, the control method 1800 proceeds to 1808, where a resultant image wrap map is stored. In such examples, the image wrap map is determined from the boresight and distortion correct HUD image process. The control method 1800 then proceeds to 1810.

At 1810, a reflection from the IR reflective target is captured using the embedded eye tracking camera(s). Then, at 1812, a distortion correct camera image and boresight image process is implemented to center of an eye box and calculate a translation matrix. The control method 1800 then proceeds to 1814, where a resultant camera sensor warp map and the translation matrix are stored. Then, the control method 1800 proceeds to 1816.

At 1816, the HUD module is installed in a vehicle, such as the vehicle 200. Then, at 1818, a user can re-boresight a HUD image. The control method 1800 then proceeds to 1820, where offsets of the HUD image obtained from the re boresight process are stored. In such examples, the offsets may be in millimeters (or another suitable unit) and x and y coordinates. Then, at 1822, the translation matrix is applied to rebore-sight the camera sensor. The control method 1800 then proceeds to 1824, where a new camera sensor warp map is stored. The control method 1800 then ends as shown in FIG. 18.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An augmented reality head-up display system for displaying graphics on a windshield of a vehicle, the augmented reality head-up display system comprising:
- one or more sensors configured to detect data indicative of parameters external to the vehicle;
- a memory circuit;
- a head-up display module having a variable image plane capability; and
- a control module in communication with the one or more sensors, the memory circuit, and the head-up display module, the control module configured to:
  - identify fiducials specific to the one or more sensors and location data for each fiducial, wherein each fiducial represents a reference point external to the vehicle specific to at least one sensor of the one or more sensors, and has a distance between the reference point and the at least one sensor of the one or more sensors;
  - store the fiducials and the location data corresponding to each fiducial in the memory circuit;
  - generate a coordinate system for a desired location of the vehicle with respect to an object, the coordinate system including the stored fiducials specific to the one or more sensors and the stored location data for each fiducial;
  - detect the vehicle approaching the object based on data from the one or more sensors; and
  - in response to the vehicle being within a defined distance threshold of the object, control the head-up display module to project a virtual object at a location in space based on the fiducials, the location data for each fiducial, and data from the one or more sensors, and dynamically change the virtual object as the vehicle moves relative to the desired location to provide trajectory guidance for a driver of the vehicle to guide the vehicle to the desired location.

2. The augmented reality head-up display system of claim 1, wherein the control module is configured to control the head-up display module to change a color of the virtual object when the vehicle is at the desired location.

3. The augmented reality head-up display system of claim 1, wherein the control module is configured to control the head-up display module to increase a size of the virtual object as the vehicle approaches the desired location.

4. The augmented reality head-up display system of claim 3, wherein the control module is configured to control the head-up display module to change the virtual object to provide a stop indicator when the vehicle is within a defined threshold of the desired location.

5. The augmented reality head-up display system of claim 4, wherein the control module is configured to control the head-up display module to cause the virtual object to move when the vehicle is at the desired location.

6. The augmented reality head-up display system of claim 3, wherein the control module is configured to control the head-up display module to change the virtual object to indicate a closing speed alert based on data from the one or more sensors.

7. The augmented reality head-up display system of claim 3, wherein the control module is configured to control the head-up display module to change the virtual object to indicate a lateral alignment of the vehicle to guide the vehicle to the desired location based on data from the one or more sensors.

8. The augmented reality head-up display system of claim 3, wherein the control module is configured to control the head-up display module to project the desired location of the vehicle.

9. The augmented reality head-up display system of claim 1, further comprising an audio output module in communication with the control module, the control module configured to control the audio output module to output an audible alert corresponding to the change in the virtual object.

10. The augmented reality head-up display system of claim 1, wherein the one or more sensors include a radar sensor, one or more cameras, and a GPS transceiver.

11. The augmented reality head-up display system of claim 1, wherein the object is one of a garage, a parking space stone, or a traffic line marking on a road.

12. The augmented reality head-up display system of claim 1, wherein the virtual object is a virtual tennis ball.

13. The augmented reality head-up display system of claim 1, wherein the control module is configured to:

determine a rate of fiducial perspective change over time of at least one of the fiducials; and in response to the rate of fiducial perspective change over time exceeding a defined threshold, dynamically change the virtual object as the vehicle moves relative to the desired location.

14. An augmented reality head-up display system for displaying graphics on a windshield of a vehicle, the augmented reality head-up display system comprising:

one or more sensors configured to detect data indicative of parameters external to the vehicle;

a memory circuit;

a head-up display module having a variable image plane capability;

an audio output module; and a control module in communication with the one or more sensors, the memory circuit, the audio output module, and the head-up display module, the control module configured to:

identify fiducials specific to the one or more sensors and location data for each fiducial, wherein each fiducial represents a reference point external to the vehicle specific to at least one sensor of the one or more sensors, and has a distance between the reference point and the at least one sensor of the one or more sensors;

store the fiducials and the location data corresponding to each fiducial in the memory circuit;

generate a coordinate system for a desired location of the vehicle with respect to an object, the coordinate system including the stored fiducials specific to the one or more sensors and the stored location data for each fiducial;

detect the vehicle approaching the object based on data from the one or more sensors;

in response to the vehicle being within a defined distance threshold of the object, control the head-up display module to project a virtual object at a location in space based on the fiducials, the location data for each fiducial, and data from the one or more sensors, and dynamically change the virtual object as the vehicle moves relative to the desired location to provide trajectory guidance for a driver of the vehicle to guide the vehicle to the desired location; and control the audio output module to output an audible alert corresponding to the change in the virtual object.

15. A method for displaying an augmented reality displaying graphics on a windshield of a vehicle, the method comprising:

identifying fiducials specific to one or more sensors of the vehicle and location data for each fiducial, wherein each fiducial represents a reference point external to the vehicle specific to at least one sensor of the one or more sensors, and has a distance between the reference point and the at least one sensor of the one or more sensors;

storing the fiducials and the location data corresponding to each fiducial;

generating a coordinate system for a desired location of the vehicle with respect to an object, the coordinate system including the stored fiducials specific to one or more sensors of the vehicle and the stored location data for each fiducial;

detecting the vehicle approaching the object based on data from the one or more sensors; and in response to the vehicle being within a defined distance threshold of the object, controlling a head-up display module of the vehicle to project a virtual object at a location in space based on the fiducials, the location data for each fiducial, and data from the one or more sensors, and dynamically change the virtual object as the vehicle moves relative to the desired location to provide trajectory guidance for a driver of the vehicle to guide the vehicle to the desired location.

16. The method of claim 15, wherein controlling the head-up display module to dynamically change the virtual object includes changing the virtual object to provide a stop indicator when the vehicle is within a defined threshold of the desired location.

17. The method of claim 15, wherein controlling the head-up display module to dynamically change the virtual object includes changing the virtual object to indicate a closing speed alert based on data from the one or more sensors.

18. The method of claim 15, wherein controlling the head-up display module to dynamically change the virtual object includes changing the virtual object to indicate a lateral alignment of the vehicle to guide the vehicle to the desired location based on data from the one or more sensors.

19. The method of claim 15, wherein controlling the head-up display module to dynamically change the virtual object includes changing a color of the virtual object when the vehicle is at the desired location.

20. The method of claim 15, wherein controlling the head-up display module to dynamically change the virtual object includes moving the virtual object when the vehicle is at the desired location.

* * * * *